United States Patent Office 2,705,243
Patented Mar. 29, 1955

2,705,243
CARBOXYALKYLATION OF KETONIC COMPOUNDS

Ralph A. Bankert, Akron, Ohio, assignor to The B. F. Goodrich Company, New York, N. Y., a corporation of New York No Drawing. Application June 22, 1950,
Serial No. 169,793

9 Claims. (Cl. 260—483)

This invention relates to a method for the carboxyalkylation of various ketonic compounds, and pertains more particularly to a carboxyalkylation process wherein a saturated aliphatic beta-lactone is reacted with a ketonic compound having at least one reactive hydrogen atom attached to the carbon atom which is in turn connected to two carbonyl groups, the reaction being carried out in the presence of an alkali metal catalyst.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone) which has the structure $$CH_2-CH_2-C=O$$
$$|\underline{\quad\quad O\quad\quad}|$$

is economically obtained from ketene and formaldehyde. The ease with which beta-lactones are now obtained makes it desirable to use these compounds as starting materials in the synthesis of many valuable compounds, including carboxyalkylated ketones and the like.

It has now been discovered that saturated aliphatic beta-lactones react in the presence of an alkali metal catalyst dissolved in an alcohol solvent therefor with compounds of the structure

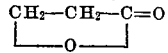

wherein each R is an alkyl radical or an alkoxy radical and $R_1$ is an alkylidene radical in which at least one reactive hydrogen atom is attached to the carbon atom contiguous to the carbonyl carbon atoms of the ketone.

This reaction proceeds in such a manner that the beta carbon atom of the beta-lactone attaches to the reactive-hydrogen containing carbon atom of the ketonic compound to form a carbon to carbon linkage, the resulting products after acidification of the reaction mixture being carboxyalkylated ketonic compounds of the structure

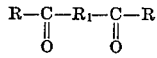

wherein R has the same meaning as above, $R_2$ is the radical derived by removing reactive hydrogen from the alkylidene radical $R_1$ of the starting ketonic compound, each $R_3$ is a member of the class consisting of hydrogen and lower alkyl radicals and $n$ is a whole number greater than 0 and less than 3, it being understood, of course, that when the reactive hydrogen containing carbon atom of the ketonic compound contains two active hydrogens, they may both be replaced by carboxyalkyl radicals. Also, due to the fact that an alcohol is utilized to dissolve the alkaline condensing agent, as will be more fully explained hereinafter, partial esterification of the carboxy groups of the carboxyalkyl radical or radicals is likely to occur so that a portion of the corresponding ester will also be obtained. The overall reaction of this invention may be depicted structurally as follows:

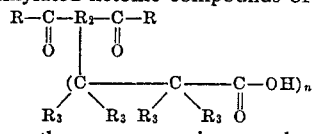

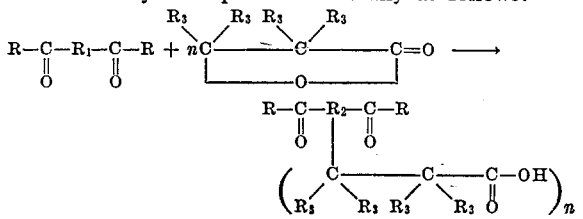

wherein R, $R_1$, $R_2$ and $R_3$ have the same significance as above. This reaction is believed to represent the first example of a reaction of a beta-lactone with a compound containing carbon-bound active hydrogens in such a way that a carbon to carbon linkage is formed.

Typical ketonic compounds having the structure shown hereinabove include methyl acetoacetate, ethyl acetoacetate, propyl acetoacetate, isopropyl acetoacetate, butyl acetoacetate, amyl acetoacetate and the like; methyl propioacetate, ethyl propioacetate, butyl propioacetate, ethyl butyroacetate, propyl butyroacetate, butyl butyroacetate, hexyl butyroacetate, methyl valeroacetate, alpha-acetyl butyl propionate, alpha-acetyl ethyl butyrate, alpha-propionyl methyl propionate, alpha-acetyl ethyl valerate and the like; acetyl acetone, propionyl acetone, butyryl acetone, caproyl acetone, ethyl acetomethyl ketone, butyl propiomethyl ketone, hexyl butyromethyl ketone, ethyl alpha-acetoethyl ketone, methyl alpha-propiohexyl ketone and the like; dimethyl malonate, diethyl malonate, dibutyl malonate, dihexyl malonate, and the like.

It is to be understood, of course, that the above compounds represent but a few of the multitude of ketonic compounds which contain one or more reactive hydrogen atoms and which will therefore react with beta-lactones in accordance with the present invention, for the nature of the alkyl group or alkoxy group is not a critical factor. In general, however it is desired that the radicals R and $R_1$ contain from 1 to 6 carbon atoms.

The beta-lactones which are reacted with ketones in accordance with this invention are saturated aliphatic beta-lactones which possess the structure

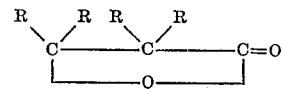

wherein each R is a member of the class consisting of hydrogen and lower alkyl radicals, preferably containing from 1 to 4 carbon atoms. Typical examples of such beta-lactones include in addition to beta-propiolactone, beta-butyrolactone, beta-isobutyrolactone, beta-n-valerolactone, beta-isovalerolactone, beta-isopropyl-beta-propiolactone, beta-ethyl-beta-butyrolactone, alpha-methyl-beta-propiolactone, alpha, alpha-dimethyl-beta-propiolactone, and the like. Especially preferred beta-lactones for use in this process are beta-propiolactone and other beta-lactones which are water-soluble; beta-lactones containing from 3 to 6 carbon atoms possess this property.

Any of the alkali metals may be used as catalysts in the present process. These metals occur in group 1A of the periodic system and include lithium, sodium, potassium, rubidium, cesium and virginium. In practice, the alkali metal is dissolved in an alcohol solvent therefor such as ethanol, propanol, butanol, hexanol, 2-propanol and the like. By the use of a solvent for the catalyst the formation of an alkali metal derivative, a probable intermediate in the reaction of this invention, is facilitated. The quantity of the catalyst utilized is not critical and may be varied considerably. In general, however, it may be stated that it is desirable to utilize from 0.5 to 2.0 moles of the alkali metal for each mole of the carbonyl compound although larger or smaller amounts may be utilized if desired.

The quantity of the beta-lactone utilized is likewise not critical. Accordingly, the lactone and the carbonyl compound may be brought together in equimolar quantities in which event one reactive hydrogen atom will be replaced by a carboxyalkyl radical or if desired an excess of the lactone may be employed, in which event at least a portion of the product will consist of a ketonic compound in which two reactive hydrogen atoms if present are replaced by carboxyalkyl radicals. It has been found that the optimum molar ratio of ketonic compound to beta-lactone to alkali metal is approximately 1:1:1 although other ratios may also be used without seriously affecting the yield of desired product.

Generally the reaction of the present invention is carried out at temperatures in the range of about 0° C. to 50° C. However, temperatures below 0° C. and higher than 50° C. are also operative although the yields obtained are not so high as those obtained when the preferred temperatures are employed.

The following specific examples are intended to illustrate more fully the process of this invention, but are not intended to be construed as limiting the scope thereof, for there are, of course, numerous possible variations and modifications. In the examples all parts are by weight.

*Example I*

46 parts (2 moles) of sodium are dissolved in 960 parts of absolute ethyl alcohol and the solution cooled to about 25° C. 292.5 parts (2.25 moles) of ethyl acetoacetate are then added to this solution after which 144 parts (2 moles) of beta-propiolactone are also added, the lactone being added over a one hour period during which the temperature is maintained at from 20° C. to 35° C. The reaction mixture is then acidified with hydrochloric acid and the salt removed by filtration. The reaction mixture is then distilled at reduced pressure to remove the alcohol. The product distills at from 0.1 to 0.7 mm. to give 162 parts (35%) of 4-carbethoxy-5-oxocaproic acid. In addition, a small quantity of the ester of this acid is also obtained.

*Example II*

Example I is repeated except that 4 moles of ethyl acetoacetate, 4 mole equivalents of sodium and 1 mole of beta-propiolactone are used and potassium is utilized as the catalyst. 4-carbethoxy-5-oxocaproic acid is again obtained in good yield.

*Example III*

92 parts (4 moles) of sodium are added rapidly to 2400 parts of absolute ethanol. After the sodium has disappeared the reaction mixture is cooled to 40° C. and 680 parts (4.25 moles) of diethyl malonate are added with vigorous stirring. To this mixture 288 parts (4 moles) of beta-propiolactone are added over a period of 30 minutes while maintaining the temperature of the mixture at about 30° C. The reaction mixture is then allowed to digest for two hours after which it is made acidic with an excess of hydrochloric acid. The precipitated sodium chloride is then removed by filtering and the alcohol removed by distillation. The distillation is continued at reduced pressures to give a forefraction of unreacted diethyl malonate and a product fraction (588 parts). The product fraction is dissolved in ether and the ether solutions washed with saturated sodium bicarbonate solution. The ether layer is then distilled at reduced pressure whereupon 233 parts (21.4%) of diethyl-2-carbethoxyglutarate are obtained. (B. P. 99°–108° C./0.5 mm.; $n_D^{25}=1.4319$; $d_4^{25}=1.0778$.) Analysis:

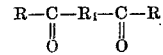

| | Calculated for $C_{12}H_{20}O_6$ | Found |
|---|---|---|
| C | 55.5 | 55.3 |
| H | 7.7 | 7.8 |
| Sapn. Equiv | 87 | 85 |
| MRd | 62.58 | 62.59 |

A higher boiling fraction is obtained which is redistilled yielding 139 parts of diethyl 4,4-bis-carboxyethyl-pimelate (B. P. 138°–139° C./0.3 mm.; $n_D^{25}=1.4444$; $d_4^{25}=1.0983$). This compound was hydrolyzed with alcoholic potassium hydroxide to give 4-carboxypimelic acid on acidification and decarboxylation (M. P. 114°–115° C.; literature value 113°–114.5° C.).

*Example IV*

46 parts of sodium are dissolved in 480 parts of methanol while maintaining the temperature of the solution at about 40° C. 200 parts (2 moles) of acetyl acetone are then added to the solution after which 144 parts (2 moles) of beta-propiolactone are added over a period of 1½ hours, the temperature being maintained at from 20° to 36° C. during the lactone addition. The reaction mixture is then digested for an additional 2 hours and is next acidified with an excess of hydrochloric acid and distilled at reduced pressure. 102 parts (30%) of 4-acetyl-5-oxocaproic acid are obtained. A minor portion of the ethyl ester of 4-acetyl-5-oxocaporic acid is also obtained. Analysis:

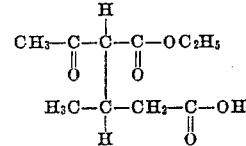

| | Calculated for $C_8H_{12}O_4$ | Found |
|---|---|---|
| C | 55.81 | 55.91 |
| H | 6.98 | 7.12 |
| Neut. Equiv | 172 | 170 |

*Example V*

Example I is repeated except that beta-butyrolactone is substituted for the beta-propiolactone. 102 parts of a compound having the structure $$CH_3-\underset{\underset{H}{|}}{C}-\underset{\underset{O}{||}}{C}-\underset{\underset{O}{||}}{C}-OC_2H_5$$

$$H_3C-\underset{\underset{H}{|}}{C}-CH_2-\underset{\underset{O}{||}}{C}-OH$$

are obtained.

Moreover, when the above examples are repeated utilizing other of the ketonic compounds disclosed hereinabove, for example, isopropyl acetoacetate, propionyl acetone, butyl acetoacetate and the like other carboxyalkylated ketonic compounds are again obtained in good yield.

The carboxyalkylated products prepared by the method of this invention are very valuable compounds. For example, they are useful as intermediates in the preparation of esters, amides, amines and the like. Also, many of the compounds are useful as insecticides, fungicides, plasticizers as well as for many other purposes.

While specific embodiments of the invention have been disclosed herein, it is not intended to limit the invention solely thereto, for it is obvious that many modifications including substitution of equivalent materials and variations in the proportions of materials used are within the spirit and scope of the invention as defined in the appended claims.

I claim:

1. The method which comprises bringing together in the presence of an alkali metal catalyst dissolved in an alcohol solvent therefor, a saturated aliphatic beta-lactone and a carbonyl containing compound of the formula $$R-\underset{\underset{O}{||}}{C}-R_1-\underset{\underset{O}{||}}{C}-R$$

wherein each R is a member of the class consisting of alkyl and alkoxy radicals and $R_1$ is an alkylidene radical in which at least one reactive hydrogen atom is attached to the carbon atom contiguous to the carbonyl carbon atoms of said compound, and then acidifying the reaction mixture, thereby to obtain a compound in which at least one of said reactive hydrogen atoms of said carbonyl containing compound is replaced by a carboxyalkyl radical.

2. The method which comprises bringing together in the presence of an alkali metal catalyst dissolved in an alcohol solvent therefor, beta-propiolactone and a carbonyl containing compound of the formula $$R-\underset{\underset{O}{||}}{C}-R_1-\underset{\underset{O}{||}}{C}-R$$

wherein each R is a member of the class consisting of alkyl and alkoxy radicals and $R_1$ is an alkylidene radical in which at least one reactive hydrogen atom is attached to the carbon atom contiguous to the carbonyl carbon atoms of said compound, and then acidifying the reaction mixture, thereby to obtain a compound in which at least one of said reactive hydrogen atoms of said carbonyl containing compound is replaced by a carboxyethyl radical.

3. The method which comprises bringing together in the presence of an alkali metal catalyst dissolved in an alcohol solvent therefor, beta-propiolactone and a carbonyl containing compound of the formula $$R-\underset{\underset{O}{||}}{C}-CH_2-\underset{\underset{O}{||}}{C}-R$$

wherein each R is a member of the class consisting of alkyl and alkoxy radicals containing from 1 to 6 carbon atoms, and then acidifying the reaction mixture, thereby to obtain a compound in which at least one of the reactive hydrogen atoms attached to the carbon atom contiguous to the two carbonyl groups of said carbonyl-containing compound is replaced by a member of the class consisting of carboxyethyl and carbethoxyethyl radicals.

4. The method which comprises bringing together in the presence of an alkali metal catalyst dissolved in an alcohol solvent therefor, beta-propiolactone and a carbonyl containing compound of the formula

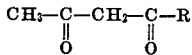

wherein R is an alkoxy radical, and then acidifying the reaction mixture, thereby to obtain a compound wherein at least one reactive hydrogen atom attached to the carbon atom contiguous to the two carbonyl groups of said carbonyl containing compound is replaced by a member of the class consisting of carboxyethyl and carbethoxyethyl radicals.

5. The method of claim 4 wherein the carbonyl containing compound is ethyl acetoacetate and the alkali metal catalyst is sodium, the product obtained being 4-carbethoxy-5-oxocaproic acid.

6. The method which comprises bringing together in the presence of an alkali metal catalyst dissolved in an alcohol solvent therefor, beta-propiolactone and a carbonyl containing compound of the formula

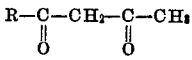

wherein R is an alkyl radical, and then acidifying the reaction mixture, thereby to obtain a compound wherein at least one reactive hydrogen atom attached to the carbon atom contiguous to the two carbonyl groups of said carbonyl-containing compound is replaced by a member of the class consisting of carboxyethyl and carbethoxyethyl radicals.

7. The method of claim 6 wherein the carbonyl-containing compound is acetyl acetone and the alkali metal catalyst is sodium, the product obtained being 4-acetyl-5-oxocaproic acid.

8. The method which comprises bringing together in the presence of an alkali metal catalyst dissolved in an alcohol solvent therefor, beta-propiolactone and a compound of the formula

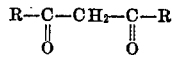

wherein each R is an alkoxy radical, and then acidifying the reaction mixture, thereby to obtain a compound wherein at least one reactive hydrogen attached to the carbon atom contiguous to the two carbonyl groups of said carbonyl-containing compound is replaced by a member of the class consisting of carboxyethyl and carbethoxyethyl radicals.

9. The method of claim 8 wherein the carbonyl-containing compound is diethyl malonate and the alkali metal catalyst is sodium, the products obtained being diethyl 2-carbethoxyglutarate and diethyl 4,4-bis-carbethoxy-pimelate.

References Cited in the file of this patent

UNITED STATES PATENTS

| | | |
|---|---|---|
| 2,342,607 | Bruson et al. | Feb. 22, 1944 |
| 2,394,255 | Northey | Feb. 5, 1946 |
| 2,396,625 | Wiest et al. | Mar. 12, 1946 |
| 2,396,626 | Wiest et al. | Mar. 12, 1946 |
| 2,438,961 | Boese | Apr. 6, 1948 |
| 2,443,818 | Elce et al. | June 22, 1948 |
| 2,449,990 | Gresham et al. | Sept. 28, 1948 |
| 2,462,357 | Caldwell et al. | Feb. 22, 1949 |
| 2,600,387 | Beears | June 28, 1950 |

OTHER REFERENCES

MacArdle: "Solvents in Synthetic Org. Chem.," pp. 47–51 (1925), (Van Nostrand).

Beilstein (Handbuch der Org. Chem.): vol. 3, p. 756 (1921).